United States Patent Office

2,845,399
Patented July 29, 1958

2,845,399

WEATHERING OF ISOOLEFIN-VINYL AROMATIC COPOLYMERS CONTAINING HYDROXY BENZ-ALDEHYDES

Raymond G. Newberg and Robert E. Clayton, Roselle Park, N. J., assignors to Esso Research and Engineering Company, a corporation of Delaware No Drawing. Application December 29, 1955
Serial No. 556,040

14 Claims. (Cl. 260—45.95)

This invention relates to high molecular weight copolymers prepared by low temperature Friedel-Crafts polymerization. More particularly, the present invention relates to polymeric compositions of improved weathering and discoloring resistance, said compositions including a major proportion of the copolymerization product of a $C_4$–$C_8$ isoolefin with a vinyl aromatic compound and a minor proportion of a hydroxy benzaldehyde. A representative type of copolymer to which the invention may be applied is one made by copolymerizing about 10 to 90, advantageously 30 to 80, weight percent of styrene with the balance being isobutylene at a temperature of about $-80°$ to $-90°$ C. (corresponding to $-112$ to $-130°$ F.), in the presence of methyl chloride as diluent and solvent, and in the presence of aluminum chloride as catalyst.

U. S. Patent 2,274,749 describes copolymers of the general type referred to above, e. g. copolymers of isobutylene and styrene, and methods of preparing same, such as copolymerization of the reactants at a temperature below about 0° C., in the presence of an active halide polymerization catalyst, and preferably in the presence of an inert volatile organic liquid serving as solvent and refrigerant. The temperature may range from about 0 or $-10°$ C. to $-100°$ C. or lower, preferably below $-50°$ or $-70°$ C., and the patent indicates that by adjusting the proportions of the two raw materials, copolymers of desired hardness, melting point, plasticity, etc. may be obtained.

Isoolefin-vinyl aromatic copolymers such as styrene-isobutylene copolymers having, for instance, a combined styrene content of about 50 to 70% by weight, and having suitable combination of high tensile strength, e. g. 1000 to 2000 lbs./sq. in. or higher, and tough thermoplastic characteristics which permit them to be sheeted out into thin, self-supporting films or extruded, molded, or otherwise shaped, have been made by the above-described polymerization processes.

However, although thin films of such isoolefin-vinyl aromatic copolymers have aged satisfactorily indoors, when exposed outdoors they have weathered badly, becoming yellow and very brittle.

According to the present invention, it has been found that the discoloration and weathering resistance of the above copolymers is remarkably increased by incorporating therein about 0.25 to 20% of a hydroxy benzaldehyde. Although meta and para hydroxy benzaldehyde are suitable for the purposes of the present invention, it has been further discovered that the compound ortho hydroxy benzaldehyde or salicylaldehyde is far more efficacious apparently because it serves as a better sun-screening agent.

The ortho, meta, or para hydroxy benzaldehyde may be compounded with the isoolefin-vinyl aromatic copolymer in any desired manner. Compounding may be accomplished by employing mutual solvents, with subsequent removal of said solvents. Compounding may also be performed by an internal mixer, kneader, or mill using conventional rubber compounding technique. Thus it is both efficient and desirable to accomplish blending in compounding equipment (at temperatures between about 150° to 350° F., preferably between 250° to 275° F.) since the mixing and processing behavior of the resulting compositions have been found to be excellent. The preferred concentration of the hydroxy benzaldehyde added to the copolymer is 0.5 to 10.0%, preferably 1 to 5%.

In producing the high molecular weight copolymers, instead of isobutylene, other aliphatic olefins may be used, preferably having more than two carbon atoms, such as propylene, normal butylenes, etc., and preferably iso-olefins having 4 to 8 carbon atoms, such as isopentene (methyl-2 butene-1) or a pentene obtained by dehydration of secondary amyl alcohol.

Instead of styrene, one may use other polymerizable mono-olefinic compounds containing a cyclic nucleus, these materials preferably being vinyl aromatic compounds, and more preferably hydrocarbons. Examples of some of these materials are: alpha-methyl styrene, para-methyl styrene, alpha-methyl para-methyl styrene, para-chlor styrene, dichlor styrenes, indene, coumarone, alpha-vinyl naphthalene, dihydro-naphthalene, etc.

The copolymerization is effected by mixing the two reactants, with or without an inert diluent or solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex

$$(AlCl_3\text{---}Al[OC_2H_5]_3)$$

and the like. If desired, such catalyst may be dissolved in a solvent such as a lower alkyl halide, e. g. methyl chloride or ethyl chloride, or carbon disulfide, a low molecular weight sulfur-free saturated hydrocarbon, etc. Volatile solvents or diluents, e. g. propane, ethane, ethylene, methyl chloride, carbon dioxide (liquid or solid), etc. may also serve as internal or external refrigerants to carry off the liberated heat of polymerization.

After completion of the copolymerization, residual catalyst is killed with water or alcohol, for example, isopropyl alcohol, and excess catalyst is removed by washing the product with water and preferably also with dilute aqueous caustic soda. The resulting solid copolymer may range from a viscous fluid or a relatively stiff plastic mass to a hard or tough, thermoplastic resinous solid, depending chiefly upon the temperature of polymerization and the proportion of cyclic reactant in the feed, but also partly on the yield of polymer obtained upon the active feed, and the type and concentration of catalyst.

Generally, the molecular weight (by the Staudinger method) of the product will range from about 800 upwards, for instance, to 3,000, 25,000, 100,000 or higher, the larger molecular weights, higher intrinsic viscosity (of at least 0.5, preferably 0.5 to 2.0) and greater toughness of polymer product at room temperature being obtained at lower polymerization temperatures, e. g., $-75°$ C. to $-130°$ C. On the other hand, with only moderately low polymerization temperatures such as $-40°$ C. or $-20°$ C., the resulting copolymers are lower in molecular weight and have intrinsic viscosities between about 0.05 to 0.35. They are either viscous liquids, soft tacky plastics, or have a hard texture.

The advantages of the present invention will be better understood from a consideration of the following experimental data:

Example I

In order to produce an isoolefin-vinyl aromatic hydrocarbon copolymer, a three-stage continuous polymerization system was set up in the laboratory, using 3 reactors of 5 liter capacity, each having an external cooling jacket in which liquefied ethylene was used as refrigerant. Each reactor was equipped with an agitator. The three reactors were connected in series with trough-type overflows.

A continuous run was made in this three-stage continuous polymerization system using a polymerization feed consisting of 60% by weight of styrene and 40% of isobutylene, using methyl chloride as diluent, and an $AlCl_3$-methyl chloride catalyst solution having a concentration of about 0.1 gram per 100 cc. A 15 wt. percent of polymerizable feed was used; (balance 85% being methyl chloride diluent).

The feed rate, catalyst addition rate and percent conversion were as follows:

| Stage No. | Feed Rate (cc./min.) | Catalyst Rate (cc./min.) | Percent Conversion |
|---|---|---|---|
| 1 | 200 | 23 | 57 |
| 2 | 223 | 40 | 79 |
| 3 | 263 | 80 | 100 |

After completion of the copolymerization, the residual catalyst was killed with an equal mixture of water and isopropyl alcohol and the product washed first with 0.1 normal NaOH and finally with water. The resulting copolymer was then in suitable form to be sheeted into films.

Two samples of the above product were taken, the first sample (sample #1) being processed without hydroxy benzaldehyde addition, 100 parts by weight of the second sample (sample #2) being blended with 1 part by weight of ortho hydroxy benzaldehyde on a rubber mill using conventional rubber compounding technique. Both samples were then calendered into films of 0.004 inch thickness, the mixing and calendering behavior of the ortho hydroxy benzaldehyde-copolymer blend being particularly good. The films may likewise be produced by conventional film extrusion processes such as the blown tubular extrusion method, flat die extrusion method, etc. Extrusion temperatures may vary from about 250° to 500° F., preferably 350° to 400° F.

The films were then continuously weathered outdoors and were periodically examined visually and flexed by hand to test for embrittlement. The results were as follows:

|  | Sample #1 | Sample #2 |
|---|---|---|
| After Two Months: |  |  |
| Color | Slightly yellowed | Colorless. |
| Embrittlement | Slight | None. |
| After Three Months: |  |  |
| Color | Yellowed | Colorless. |
| Embrittlement | Broken and blown away except for some jagged segments. | None. |

Sample #2, produced according to the present invention had no change after 4 months but in 6 months became very slightly embrittled (satisfactory) while still remaining colorless. The above data show the advantage of both color and embrittlement resistance of sample #2 produced according to the invention employing 1% added ortho-hydroxy benzaldehyde.

*Example II*

The same general procedure was repeated except that the amount of ortho-hydroxy benzaldehyde added was 5% instead of 1%. The results were identical when compared to sample #2 of Example I up to 4 months. After 6 months, the composition of the invention containing 5% of the hydroxy benzaldehyde exhibited only a slight trace of embrittlement which was somewhat superior to the embrittlement of sample #2 of Example I.

The above procedure was again repeated substituting 1%, 2% and 5% of the following additives in place of the 5% ortho-hydroxy benzaldehyde: diethylene triamine salt of beta naphthol, alkylated phenol sulfides, triphenyl phosphite, heptylated diphenylamine, aldol alpha naphthylamine, and P, P' dimethoxy diphenylamine. In all of the latter instances, the respective additives substituted for the benzaldehyde of the invention were completely ineffective.

The above data show that hydroxy benzaldehydes are the only materials suitable for the intended purposes of the present invention.

It is not intended that the present invention be unduly limited since resort may be had to various modifications and variations thereof without departing from the spirit of the invention or the scope of the appended claims.

What is claimed is:

1. A composition comprising a copolymer of about 10 to 90% of a $C_4$ to $C_8$ isoolefin with about 10 to 90% of a vinyl aromatic hydrocarbon and about 0.25% to 20% of a hydroxy benzaldehyde.

2. Composition according to claim 1 in which the isoolefin is isobutylene.

3. Composition according to claim 1 in which the vinyl aromatic hydrocarbon is styrene.

4. Composition according to claim 1 in which the hydroxy benzaldehyde is ortho hydroxy benzaldehyde.

5. A composition comprising about 100 parts by weight of a copolymer of isobutylene with a vinyl aromatic hydrocarbon and about 0.5 to 10.0 parts by weight of a hydroxy benzaldehyde.

6. Composition according to claim 5 in which the vinyl aromatic hydrocarbon is styrene.

7. Composition according to claim 5 in which the aldehyde is ortho hydroxy benzaldehyde.

8. Composition according to claim 5 in which the vinyl aromatic hydrocarbon is styrene and the aldehyde is ortho hydroxy benzaldehyde being present in amounts between about 1 to 5 parts by weight.

9. A shaped article of manufacture of improved resistance to discoloration and weathering which consists essentially of the composition of claim 1.

10. An extruded article of improved resistance to discoloration and weathering which consists of the composition of claim 4.

11. A self-supporting film of improved resistance to discoloration and weathering which consists essentially of the composition of claim 5.

12. A self-supporting film of improved resistance to discoloration and weathering which consists of the composition of claim 8.

13. A process for producing a self-supporting film which comprises mixing with about 100 parts by weight of a copolymer of about 20 to 70% of a $C_4$-$C_8$ isoolefin with about 30 to 80% of a vinyl aromatic hydrocarbon, about 0.5 to 10 parts by weight of a hydroxy benzaldehyde and calendering the resulting mixture formed at a temperature between about 150° to 350° F. into a self-supporting film.

14. A process for producing a self-supporting film which comprises mixing with about 100 parts by weight of a copolymer of about 30 to 60% isobutylene and about 40 to 70% styrene, about 1 to 5 parts by weight of ortho-hydroxy benzaldehyde and extruding the mixture formed at a temperature between about 250° to 500° F. into a self-supporting film.

References Cited in the file of this patent

UNITED STATES PATENTS 2,364,027     Marshall _____ Nov. 28, 1944

OTHER REFERENCES

Newberg: India Rubber World (May 1949).